United States Patent [19]

Higgins

[11] Patent Number: 4,612,746

[45] Date of Patent: Sep. 23, 1986

[54] TRENCH DUCT AND COVER ASSEMBLY

[75] Inventor: Robert G. Higgins, 1112 W. North Ave., Apt. 4, Pittsburgh, Pa. 15212

[73] Assignee: Midland-Ross Corporation, Cleveland, Ohio

[21] Appl. No.: 693,463

[22] Filed: Jan. 22, 1985

[51] Int. Cl.[4] .......................... E04F 17/08; E04B 5/48
[52] U.S. Cl. ...................................... 52/221; 52/126.2; 174/49
[58] Field of Search ................. 52/221, 126.2; 174/49; 220/3.4

[56] References Cited

U.S. PATENT DOCUMENTS

| | | | |
|---|---|---|---|
| 3,074,208 | 1/1963 | Seidel | 52/221 |
| 3,101,097 | 8/1963 | Murray | 138/92 |
| 3,237,356 | 3/1966 | Fork | 52/221 |
| 3,262,238 | 7/1966 | Fork | 52/221 |
| 3,368,311 | 2/1968 | Fork | 52/221 X |
| 3,394,509 | 7/1968 | McKinley | 52/221 |
| 3,435,568 | 4/1969 | Hoseason et al. | 52/221 |
| 3,453,791 | 7/1969 | Fork | 52/221 |
| 3,494,084 | 2/1970 | Hazen | 52/221 |
| 3,494,381 | 2/1970 | Fork | 52/221 |
| 3,545,150 | 12/1970 | Butler | 52/220 |
| 3,593,472 | 7/1971 | Bargar | 52/221 |
| 3,594,966 | 7/1971 | Janic | 52/221 X |
| 4,404,779 | 9/1983 | Calhoun et al. | 52/126.2 |

Primary Examiner—J. Karl Bell

[57] ABSTRACT

A subfloor electrical trench duct includes an elongated U-shaped body supported by adjustable support members and has an access cover. The cover is supported by one leg of each of a pair of identical, oppositely disposed L-shaped channels extending axially of the body. A first leg of each channel has a predetermined width such that it will extend to a position substantially flush with the outer surface of the cover when the cover is supported by the second leg. The second leg, in turn, has a predetermined width such that it extends a predetermined distance above the cover when the cover is supported by the first leg for accommodating placement of carpet or tile on the cover. Each channel includes an elastomeric sealing member disposed at the internal vertex area thereof to effect a seal with the cover. A seal member is also advantageously provided at the facing end areas of adjacent covers.

21 Claims, 5 Drawing Figures

TRENCH DUCT AND COVER ASSEMBLY

BACKGROUND OF THE INVENTION

This invention pertains to the art of electrical wireways and, more particularly, to subfloor trench duct assemblies. The invention is particularly applicable to sealing removable covers on electrical trench ducts and will be described with particular reference thereto. However, it will be appreciated by those skilled in the art that the invention has broader applications and may be used in other applications and environments.

The use of subfloor electrical trench duct assemblies has come to be a widely accepted method of supplying power, communication lines, and data lines to any number of stations within an office or industrial complex. These assemblies are capable of carrying a wide variety of different cables, and are easily accessible through an opening at the top area thereof to accommodate the addition or removal of cables without the necessity of having to pull or string them through the ducts.

Inasmuch as trench ducts must be placed in floors intended to receive a variety of different surface coverings, it is desirable to have means for allowing closure of the trench ducts without regard to the presence or absence of a floor covering. To accomplish this effectively without the necessity of having a dedicated design of trench duct cover for each separate floor covering, a separate strip between the body of the trench duct and the cover member has been used. Such strip may be placed in several different orientations to accommodate a particular flooring surface.

The type of strip arrangement used to form an intersection between the duct and the cover has varied vastly in configuration. One prior design comprises a rail having a generally Z-shaped cross-section wherein one base of the Z is longer than the other. Depending upon which base was placed perpendicular to the plane of the cover member, an intersection could be formed either flush with the cover or extending thereabove. A variety of other shapes were also attempted, including rail members having L-shaped cross-sections and generally rectangular cross-sections with axial ledges along one side thereof.

One problem associated with the use of subfloor trench ducts is their inherent susceptibility to spilled fluids, dust particles, and the like. It was, therefore, found to be desirable to provide some means for sealing the trench duct from exposure to these hazards by providing an axial sealing member between the cover and trench duct body. One prior construction created a seal by having the rail itself constructed from a plastic material. However, when the rail is constructed of plastic, it must necessarily be constructed of a semi-rigid material which is less likely to form an effective seal.

Electrical trench ducts are typically of such lengths that a plurality of covers disposed in end-to-end relation must be used. It is also desirable, in conjunction with sealing the cover longitudinally, to seal the intersection between adjacent ones of the covers.

It has, therefore, been considered desirable in the industry to develop an arrangement for overcoming the foregoing problems. The subject invention is deemed to meet these needs and others, and provides an assembly which allows a subfloor electrical trench to be adaptable to floor coverings of varying thickness, which provides an effective seal between a trench duct and an associated cover, and which provides an effective seal at the ends of adjacent covers.

BRIEF DESCRIPTION OF THE INVENTION

In accordance with the present invention, a new and improved trench duct assembly and cover sealing assembly are advantageously provided.

More specifically in accordance with the invention, an elongated duct body has a bottom wall with first and second side walls extending generally normally therefrom in laterally spaced opposed relation so that the body has a generally U-shaped cross-section. The outer end of one side wall receives an elongated rail which includes a generally L-shaped channel receiver portion extending axially thereof. A generally L-shaped channel member having first and second legs of predetermined widths is closely disposed in the channel receiver. A receiving groove extends axially along the internal vertex area of the channel, and a seal member is closely confined within this receiving groove. A cover member or plate is received in and supported by the channel member such that one leg of the channel member is closely disposed to a side edge of the cover, while the second leg supports the cover. At the same time, a corner of the cover is placed in sealing engagement with the seal member. In one orientation of the channel member, the first leg extends outwardly beyond an outer surface of the cover by some predetermined distance. In a second orientation of the channel member, the first leg is generally flush with the outer surface of the cover.

According to another aspect of the invention, the channel receiver portion receives a planar support member in generally parallel spaced relation to the bottom wall. The planar support member includes a support pad thereon in supporting relation to the cover. When a plurality of cover members or plates are located in end-to-end relation along a continuous run of a trench duct, interface areas between adjacent cover members are sealed by placement of the support members therebeneath.

In accordance with another aspect of the invention, both side walls of the trench duct body have like rails and channel members associated therewith in opposed, facing relation to each other. The cover is received and supported along the opposite side edges thereof by the channel members associated with the two side walls.

In accordance with still another aspect of the invention, the seal member is generally cylindrical and is constructed from a deformable material. The receiving groove in the channel member closely embraces a major portion of the circumference of the seal member.

In accordance with yet a further aspect of the invention, a new cover sealing assembly is advantageously provided.

The principal advantage of the present invention is the provision of a new and improved trench duct assembly adapted to readily accommodate floor coverings of various types and thicknesses thereon.

Another object of the invention is the provision of such an assembly wherein an effective seal is provided between the trench duct body and associated cover members or plates.

A further advantage of the invention resides in the provision of an arrangement to effectively seal between the end areas of adjacent cover members in a trench duct assembly.

Additional advantages and benefits for the subject invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof, and wherein.

DESCRIPTION OF THE PREFERRED AND ALTERNATE EMBODIMENTS

Figure 1:
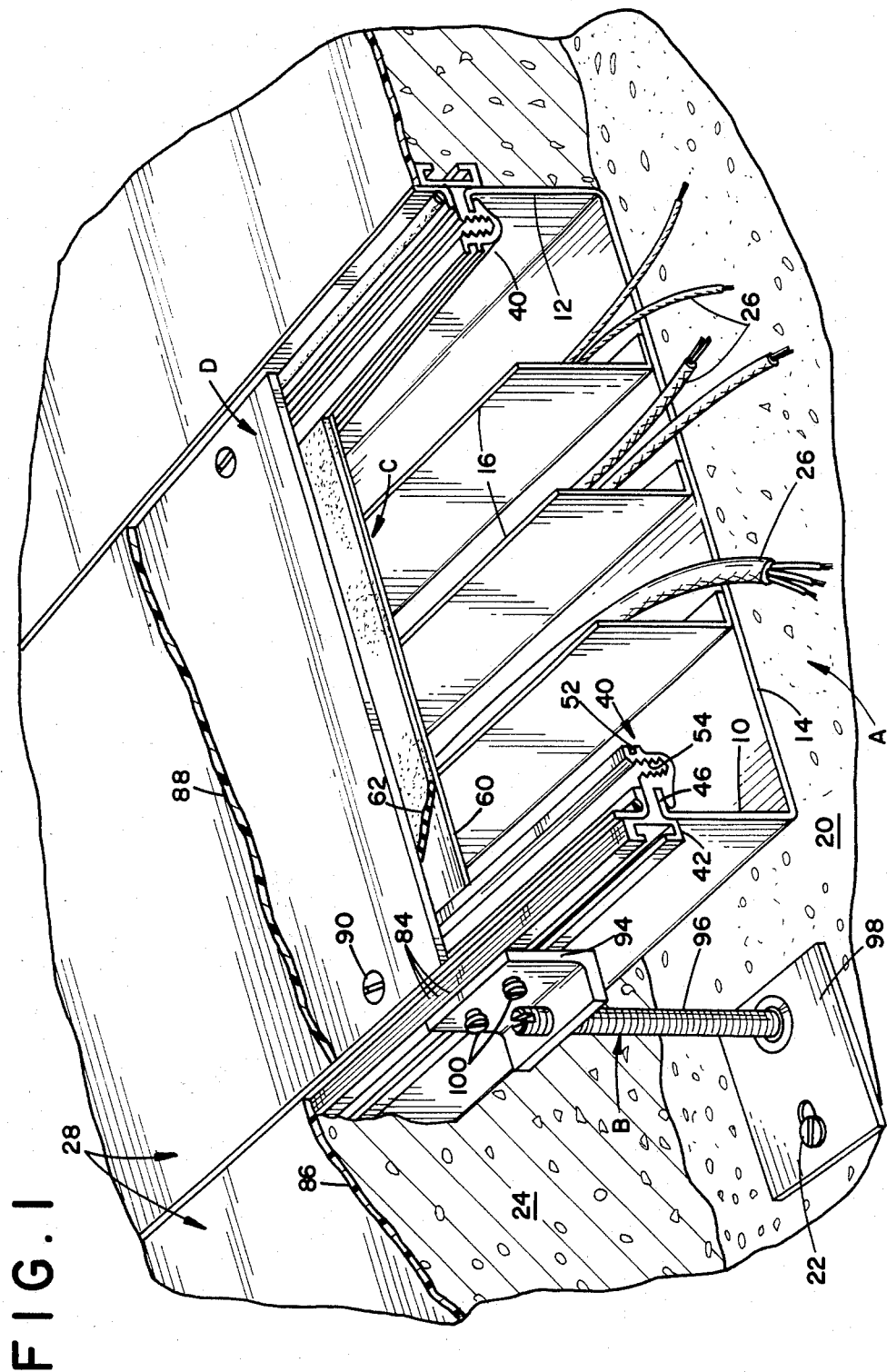
FIG. 1 is a perspective view, partly broken away for ease of illustration, a portion of a trench duct assembly formed according to the invention.

Referring now to the drawings wherein the showings are for purposes of illustrating the preferred and alternate embodiments of the invention only and not for purposes of limiting the same, FIG. 1 illustrates a typical installation for the new electrical trench duct assembly. In general, the assembly is comprised of a trench duct A supported on a rigid base by adjustable supporting means B. Planar support members C are utilized at spaced intervals longitudinally along the trench duct to support and seal the cooperating, facing ends of adjacent cover members or plates D.

More particularly, trench duct A includes laterally spaced apart first and second side walls 10, 12 which extend generally normally outward from one side of a bottom wall 14 adjacent opposed bottom wall side edges so that the duct body has a generally U-shaped cross-section. In the preferred embodiment, trench duct A is constructed of steel, though it is to be appreciated that many other materials are suitable for construction thereof. The trench duct advantageously includes a plurality of longitudinally extending dividing walls 16 intermediate side walls 10, 12 for separating the duct into a plurality of isolated wireways. While three such dividing walls are shown, it is to be appreciated that a greater or lesser number could be used to accommodate various specific needs or applications without departing from the overall intent of the subject invention.

Figure 2:
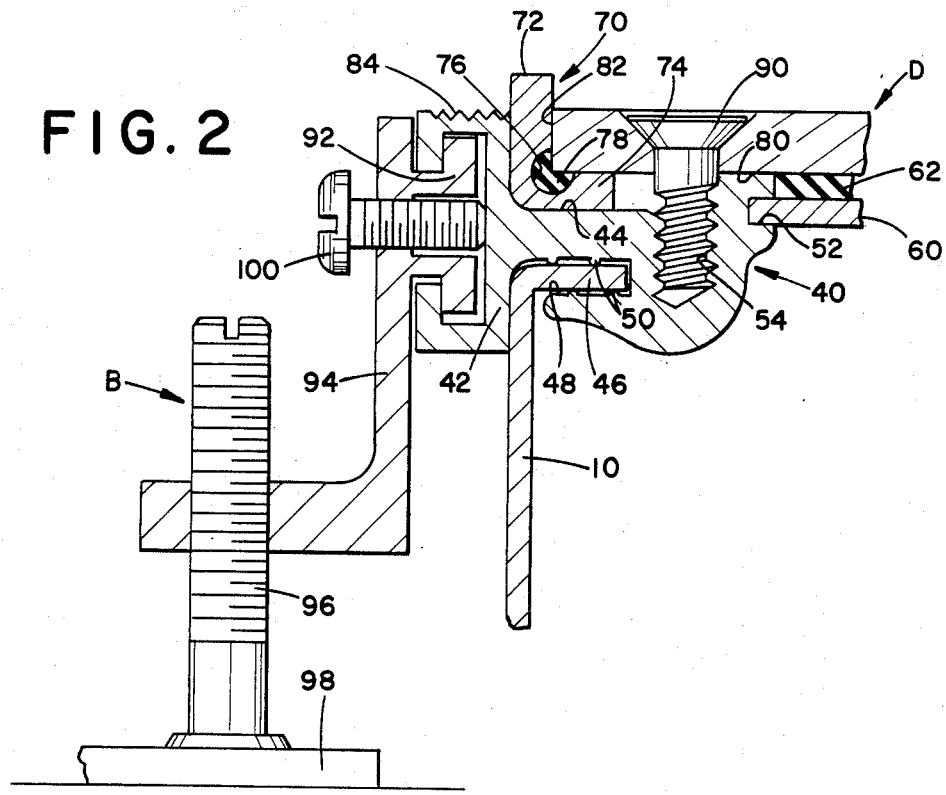
FIG. 2 is a transverse cross-sectional view of a portion of FIG. 1 showing a cover sealing assembly in a first orientation.

A typical installation for the trench duct is on a rigid concrete base 20 wherein the duct is supported by a plurality of supporting means B. While only one such supporting means is shown in FIGS. 1 and 2, it will be appreciated that a plurality of these means are located at spaced intervals along side walls 10, 12 as is known in the art. Each support member is anchored to concrete base 20 by a conventional mechanical fastener 22 and is adjustably mounted to duct A for achieving a preselected height or for leveling the duct. The trench duct is mounted to base 20 and adjusted such that the outer terminal ends of side walls 10, 12 will be generally coextensive with the upper surface of poured concrete floor 24. Wires, cables, and the like 26 are placed into and housed by duct A, and cover members D complete the basic assembly. If desired, a suitable floor covering 28 may be placed on the floor surface and on cover plates D.

FIG. 2 shows the subject new assembly in association with duct side wall 10. It is to be appreciated, however, that the arrangement for side wall 12 is identical thereto and opposite therefrom unless otherwise specifically noted. In FIG. 2, a rail 40 provides an interconnection between the distal end of duct first side wall 10 and a continuous support track 42. Rail 40 may be constructed from any suitable material, but in the preferred embodiment, an aluminum extrusion is employed. Support track 42 defines a T-shaped channel and is employed to mount a plurality of supporting means B to the duct at spaced intervals over the length thereof.

When mounted in position, rail 40 defines a generally L-shaped channel receiver portion 44 adjacent to and coextensive with the distal edge of side wall 10. A ledge or shoulder 46 is included at the distal edge of the side wall and extends generally normally therefrom toward second side wall 12 (FIG. 1). Ledge 46 is closely received by an axial groove 48 in rail 40 for mounting the rail to the duct. A plurality of spaced apart ribs 50 on opposite side faces of the groove engage the opposed sides of ledge 46 to enhance the cooperative retained relationship between the ledge and rail. A second axial groove 52 is included in the body of rail 40 and opens in a facing relationship with duct second wall 12 for reasons to be described. A fastener receiving area 54 is located in the upper or top area of rail 40, also for reasons to be described.

Each planar support member C is comprised of a planar brace 60 which, in the preferred embodiment, is constructed of steel or the like. The brace is received by second grooves 52 in the rail associated with each of duct side walls 10, 12 (FIG. 1), and may be placed at a preselected position axially along the duct. Support member C includes a support pad 62 disposed in covering relation with brace 60. Support pad 62 may be securely affixed to brace 60 as by gluing or the like, and the pad preferably comprises a deformable or elastomeric material such as rubber. Pad 62 functions to interconnect cover member D and brace 60 with cushioned support. When a plurality of cover members D are employed along a continuous duct section in end-to-end relation, support members C may be placed at intersection areas between adjacent cover members so as to be in supporting relation to each. In this orientation, pad 62 serves to obstruct or seal the joint area between the two cover members.

Closely disposed within the channel receiver 44 of rail 40 is a generally L-shaped channel member 70 comprised of a first leg 72 and a second leg 74 having predetermined widths. An axially running receiving groove 76 is included at the interior vertex zone of the channel member and is adapted to closely receive a seal member 78. In the preferred embodiment, the channel member 70 is constructed of aluminum, but it will be appreciated that numerous other materials also may be satisfactorily utilized.

Figure 4:
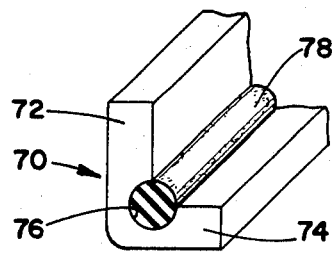
FIG. 4 is a perspective view of one form of a cover sealing member used in the new trench duct assembly; and, FIG. 5 is a view similar to FIG. 4 showing an alternate construction for the cover sealing member.

Referring particularly now to FIG. 4, and with continuing reference to FIG. 2, the width dimension of the first leg 72 is greater than that of second leg 74. Seal member 78 has a cylindrical cross-section and is constructed from a deformable material such as rubber or the like. Receiving groove 76 closely embraces seal member 78 over a substantial portion of its periphery so as to act as a seal retainer mechanism. Seal member 78 is adapted to sealingly engage the side of an associated cover member D in a manner to be described.

In FIG. 2, channel member 70 is oriented within channel receiver 44 so as to have first leg 72 disposed generally parallel to duct first side wall 10 and second leg 74 disposed generally parallel to duct bottom wall 14. In this orientation, cover member D is actually supported at the bottom face 80 thereof by second leg 74. First leg 72, in turn, is closely disposed against cover member side edge 82 so that the cover member is effectively sealed. As will be noted from a comparison of FIGS. 2 and 4, seal member 78 is deformed by the cover member to enhance the sealing relationship realized therebetween. The width of first leg 72 is chosen so as to project outwardly beyond the top surface of the cover member by some predetermined distance.

In the preferred embodiment, rail 40 includes a screed surface 84 which is generally flush with the outer surface of the cover member. Therefore, first leg 72 of channel 70 also projects outwardly beyond the screed surface 84 (FIG. 2). In this manner, first leg 72 defines an intersection or boundary between floor covering portions 86, 88 (FIG. 1) received on the floor adjacent the trench duct and on the cover plate, respectively. It is usually desired that the width of first leg 72 be such that the outer free edge thereof will be positioned flush with the top surface of the floor covering.

Cover member D is fixedly secured in place relative to channel member 70 by means of conventional threaded fasteners, one such fastener being designated by numeral 90 in FIGS. 1 and 2. When secured by this means, cover member D is drawn into close deforming engagement with seal member 78 to enhance the sealing relationship therebetween. In the preferred construction shown, fasteners 90 are received by fastener receiving area 54. This area is defined by an upwardly opening groove for allowing receipt of the fasteners at random locations axially along duct A. Also, cover members D in the preferred construction comprise steel plates, although other materials could also be suitably employed.

Figure 3:
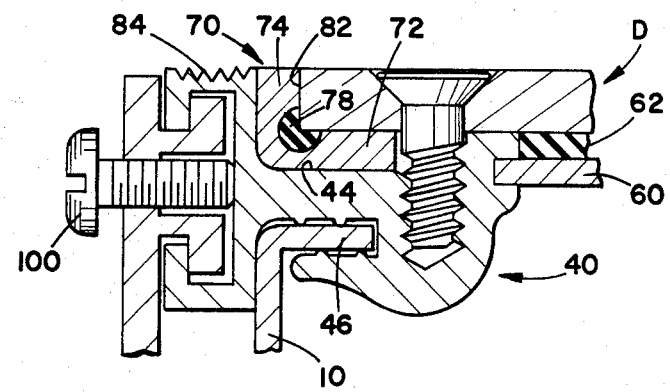
FIG. 3 is a view similar to FIG. 2 showing the cover sealing assembly in a second orientation.

If it is desired to have channel 70 be flush with the top surface of cover member D, and with reference to FIG. 3, channel 70 is oriented so that first leg 72 is placed in supporting relation to the cover member. In this orientation, therefore, second leg 74 extends upwardly between channel receiver 44 and side edge 82 of the cover member. The width of second leg 74 is dimensioned so that the outer free edge thereof will be substantially flush with the outer surface of the cover plate and with screed surface 84. Such orientation is desirable in applications where no floor covering is to be placed on the surface of floor 24 or on the trench duct assembly.

Supporting means B includes a rail mounting portion 92 adapted to be slidably received by support track 42 in supporting relation therewith. A support riser 94 is integral with mounting portion 92 and is threadably received by an elongated, threaded support shank 96. This support shank is rotatably received by a support base 98 which rests on rigid base 20 and is secured thereto by fastener 22. A pair of locking fasteners 100 in mounting portion 92 allow the mounting portion to be releasably secured at some desired location along support track 42. Rotation of shank 96 in one direction or the other effects an adjustment in the height of trench duct A relative to base 20. Appropriate adjustment of the plurality of supporting means B employed with a typical trench duct installation in like manner facilitates proper positioning of the duct prior to pouring of encasing concrete 24.

Figure 5:
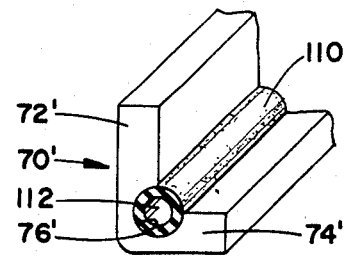

FIG. 5 shows a modified form of the seal member used in the L-shaped channel where like components are identified by like numerals with a primed (') suffix and new components are identified by new numerals. Here, the overall conformation and function of channel 70' is the same as previously described. Seal member 110, however, is hollow or tubular in nature, having an opening 112 extending coaxially therethrough. While the function of this seal member is identical to that previously described, the hollow nature of the construction allows the seal to be more readily deformed when the cover plate is installed thereon. If desired for some reason, it would also be possible to fill opening 112 with a different type of material such as a soft foam or the like.

The invention has been described with reference to preferred and alternative embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A trench duct assembly comprising:
   an elongated duct body having a bottom wall with first and second side walls extending generally normally outward therefrom in laterally spaced opposed relation for defining a generally U-shaped body cross-section;
   a rail associated with said body at a distal end of said first side wall including a generally L-shaped channel receiver portion disposed adjacent to and axially of said distal end;
   a generally L-shaped channel member closely disposed in said channel receiver portion with said channel member having first and second legs of predetermined widths joined at a vertex zone, said channel member further including a receiving groove extending axially along said vertex zone;
   a seal member closely confined in said receiving groove; and,
   a cover member having a predetermined thickness in cooperative association with said channel member, one leg of said channel member being closely disposed to a side edge of said cover member and the other leg of said channel member being disposed in supporting relation to said cover member with said seal member sealingly engaging said cover member at generally a corner area thereof, the width dimensions of said channel member legs being such that an outer terminal end of said one leg is generally flush with an outer surface of said cover member in a first orientation of said channel member and said one leg end extends outwardly from said cover member outer surface by some predetermined distance in a second orientation of said channel member.

2. The trench duct assembly of claim 1 further including a first ledge adjacent said distal end of said first side wall extending generally normally therefrom toward said second side wall with said rail being associated with said body at said first ledge.

3. The trench duct assembly of claim 1 wherein said rail includes a means for receiving fasteners at spaced intervals therealong for securing said cover member thereto.

4. The trench duct assembly of claim 1 wherein said receiver portion includes means for locating a planar support member in generally parallel spaced relation to said bottom wall.

5. The trench duct assembly of claim 4 further including a planar support member cooperatively associated with said locating means, and a support pad in covering relation with said support member.

6. The trench duct assembly of claim 5 wherein said cover member comprises a pair of cover members disposed in an end-to-end abutting relationship and having a joint area therebetween, said support pad sealingly engaging said cover members along said joint area.

7. The trench duct assembly of claim 1 further including an adjustable support member disposed in supporting relation to said body, said support member being selectively adjustable in a direction generally normal to said bottom wall.

8. The trench duct assembly of claim 7 wherein said support member is selectively movable axially along said body.

9. The trench duct assembly of claim 1 wherein said seal member has a cylindrical conformation and is constructed from a deformable material, and said receiving groove closely embraces a major portion of the circumference of said seal member.

10. The trench duct assembly of claim 9 wherein said seal member includes a bore coaxially therethrough.

11. The trench duct assembly of claim 1 wherein said seal member is constructed from an elastomeric material.

12. The trench duct assembly of claim 1 wherein said rail includes an axially extending screed surface generally flush with said cover member.

13. The trench duct assembly of claim 1 wherein said second side wall has a second rail associated with the distal end thereof with said second rail including a second generally L-shaped channel receiver portion, and a second generally L-shaped channel member closely received in said second channel receiver portion, said cover member being supported adjacent opposed side edges thereof by said channel member and said second channel member in covering relation with said duct.

14. The trench duct assembly of claim 13 wherein said rail and second rail and said channel member and second channel member are identical to each other and oppositely disposed in facing relation on said first and second side walls, respectively.

15. A cover sealing assembly comprising:
a generally L-shaped channel receiver;
a generally L-shaped channel member closely disposed in said channel receiver with said channel member having first and second legs of predetermined widths joined at a vertex zone, said channel member further including a receiving groove extending axially along said vertex zone;
a seal member closely confined in said receiving groove; and,
a cover member having a predetermined thickness supported by said L-shaped channel member, one leg of said channel member being disposed in supporting relation to said cover member with said seal member sealingly engaging said cover member along a corner area thereof, the width dimensions of said channel member legs being such that an outer terminal end of said one leg is generally flush with an outer surface of said cover member in a first orientation of said channel member and said one leg terminal end extends outwardly from said cover member outer surface by some predetermined distance in a second orientation of said channel member.

16. The cover sealing assembly of claim 15 wherein said receiver portion further includes a means for locating a planar support member generally parallel to said cover member.

17. The cover sealing assembly of claim 16 further including a planar support member cooperatively associated with said locating means, and a support pad in covering relation with said support member.

18. The cover sealing assembly of claim 17 wherein said cover member comprises a pair of cover members disposed in end-to-end abutting relation and having a joint area therebetween, said support pad sealingly engaging said cover members along said joint area.

19. The cover sealing assembly of claim 15 wherein said seal member is generally cylindrical and is constructed from a deformable material.

20. The cover sealing assembly of claim 19 wherein said seal member is constructed of an elastomeric material.

21. The cover sealing assembly of claim 19 wherein said receiving groove closely embraces a major portion of the circumference of said seal member.

* * * * *